G. B. Mallette,
Portable Fence,
Nº 31,611.    Patented Mar. 5, 1861.
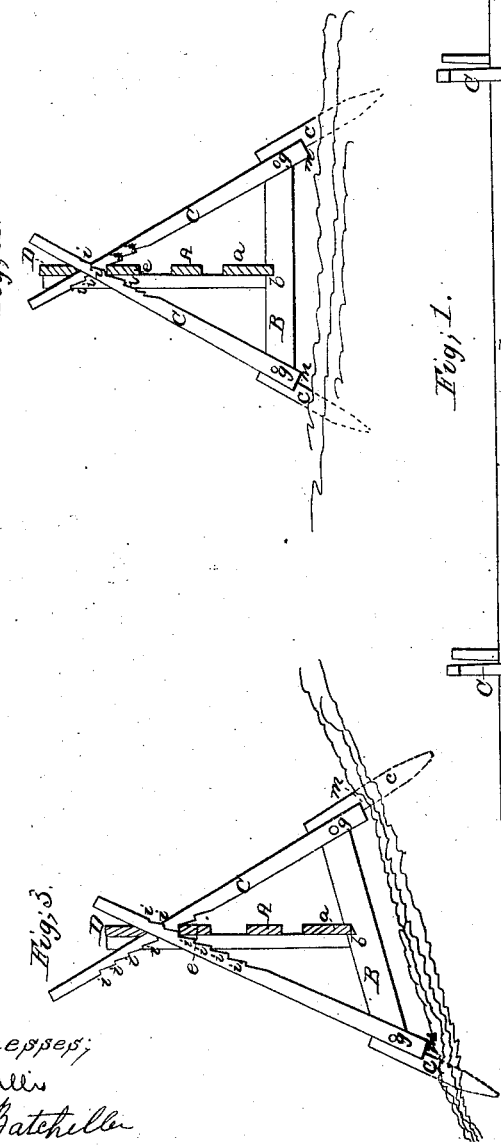
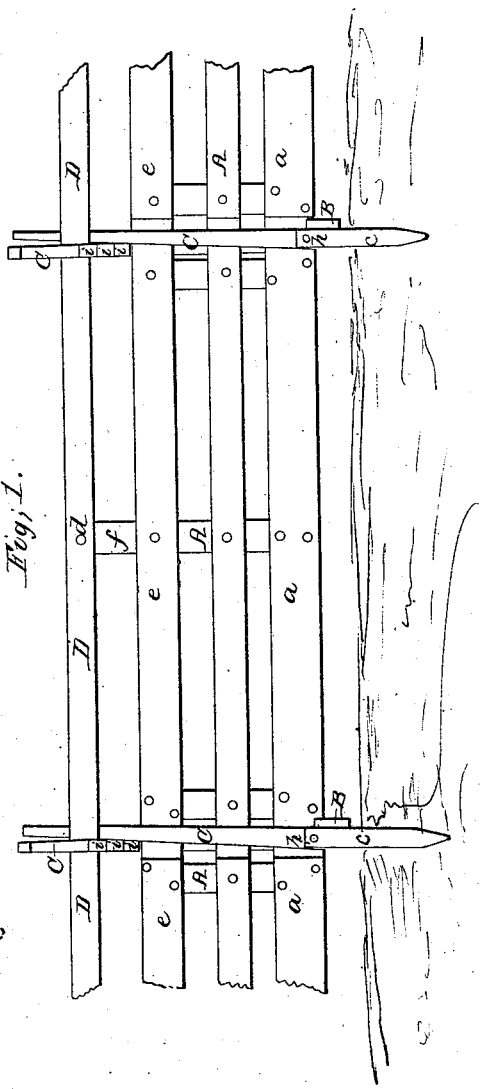
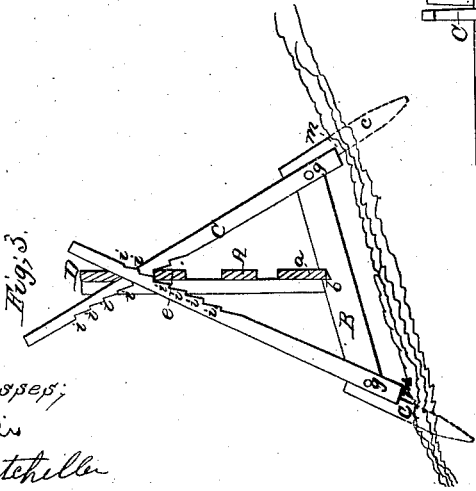
Witnesses:
S. S. Allis
L. B. Batcheller
Inventor:
G. B. Mallette
By his attorney J. Fraser

UNITED STATES PATENT OFFICE.

G. B. MALLETTE, OF MILLPORT, NEW YORK.

PORTABLE FIELD-FENCE.

Specification of Letters Patent No. 31,611, dated March 5, 1861.

*To all whom it may concern:*

Be it known that I, G. B. MALLETTE, of Millport, in the county of Chemung and State of New York, have invented a new and Improved Portable Fence; and I do hereby declare that the following is a full and exact description thereof, reference being had to the accompanying drawings, making part of this specification.

Figure 1, is a side elevation of a portion of fence constructed with my improvements; Fig. 2, a transverse section thereof, as arranged upon level ground; Fig. 3, a corresponding section thereof, as arranged upon sloping ground.

Like letters designate corresponding parts in all the figures.

The fence may be made in sections or "panels," A, A, in the usual manner, with rails and cross battens. But the height of the sections need not be so great as usual, by one rail.

My improvements principally relate to the novel construction and arrangement of cross stakes C, C, pivoted to a supporting stretcher-bar B. A single bolt, or pivot, $g$, is employed to connect each stake with the end of the stretcher-bar, for each set, as represented. This arrangement enables the stakes to be placed at any required angles to each other, and to the bar B; and also serves to guide the stakes into the ground obliquely, and so that they will increase in mutual inclination toward each other, in the act of driving, and thus be tightened down over the sections or "panels."

The panels A, A, rest upon the middle of the bars B, B, the lower rails $a$, $a$, fitting into notches $b$, $b$, in the upper edges of the bars, to keep the sections in place. The sections are held in an upright position, by the pivoted cross stakes C, C; and in order to make the hold of the stakes upon the sections firm and sure, I provide their inner edges, or sides, to a sufficient extent, with notches $i$, $i$, to fit over the top edges of the top rails $e$, $e$, of the sections, substantially as represented.

The mode of action is clearly understood by inspecting the drawings. The notches being in both of each pair of stakes, and at short intervals, any two notches of the two stakes may be selected, which will hold the sections in a vertical position. Thus they are adapted to holding the sections vertically, as well on sloping ground, in the manner shown in Fig. 3, as upon level ground, in the manner represented in Fig. 2.

When the ground is firm, and the stakes are driven in till well tightened over the fence sections, by the use of these notches $i$, $i$, the fence will be sufficiently secure for ordinary uses, without additional support, or fastenings. But in order to render the fence perfectly secure, especially where the ground is light and loose, I add king-rails, or riders, D, D, on the top of the fence, resting in the forks of the stakes, as shown in the drawings. The mere weight of the riders assists greatly in holding the stakes and sections firmly in place, with the assistance of the notches $i$, $i$; but to make the riders perfectly effectual in securing the fence, and, at the same time, to enable them to be made small and light, I fasten them on the fence, by passing a bolt, pin, or nail, $d$, through each rider, and through a cross batten $f$, which is attached to the middle of each fence section, or "panel," and projects upward sufficiently for the purpose, substantially as shown in Fig. 1. This bolt, pin, or nail, may be so inserted as to be readily drawn out, for the purpose of taking down and moving the fence. The riders complete the proper height of the fence.

A fence constructed as above, has no contact with the ground, except at the lower end of each stake C. And this portion of the stakes is the only part of the fence liable to speedy decay. To obviate all imperfection, or objection, in this particular, I add splice pieces $c$, $c$, to the lower ends of the stakes, substantially as represented in the drawings. These splice pieces are the only parts which enter the ground, and as soon as they decay, they are taken off, and new ones substituted, without renewing the main portion of the stakes, or taking the fence apart. In order to give the spliced stakes the necessary strength, and power of withstanding the blows, in driving them into the ground, the main part of each bears upon a shoulder $m$, of its splice. This shoulder, together with a single pin, or bolt, $h$, driven through both parts, makes the stake sufficiently strong and firm. The bolt, or pin, $h$, may also serve as a pivot to allow a slight side movement of the stake for any purpose.

The stakes arranged and inserted in the ground as above described, are not liable to be loosened, or heaved out by the frost, or freezing of the ground.

I do not claim cross stakes attached to a stretcher-bar, and driven into the ground obliquely; nor do I claim the employment of king rails, or riders, in addition to the regular sections or "panels"; but

What I claim as my invention and desire to secure by Letters Patent is,

The stakes C, C, armed with the splice pieces c, c, when pivoted to their supporting stretcher-bar B, and provided with the notches i, i, in their inner edges, or sides, in combination with the sections A, A, substantially as and for the purpose herein specified.

G. B. MALLETTE.

Witnesses:
JOHN DENSON,
S. R. PAGE.